Oct. 2, 1956
C. B. SCOTTY
2,765,412
DETERMINATION OF POROSITY AND PERMEABILITY
OF SUBSURFACE FORMATIONS
Filed April 20, 1953
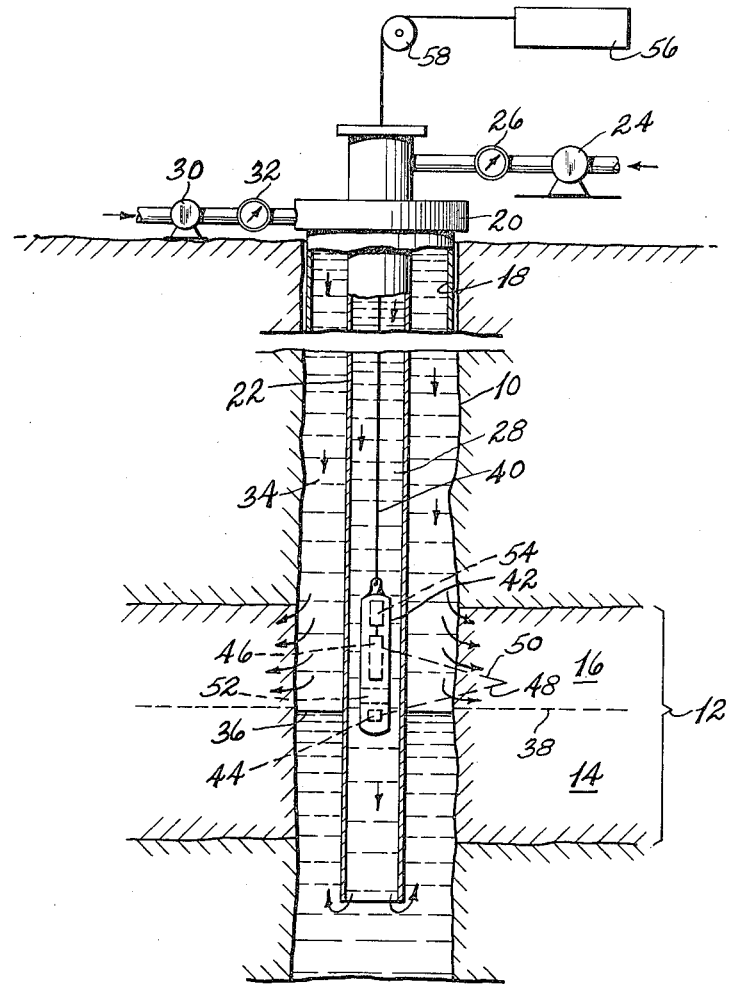

United States Patent Office 2,765,412
Patented Oct. 2, 1956

2,765,412

DETERMINATION OF POROSITY AND PERMEABILITY OF SUBSURFACE FORMATIONS

Clarence B. Scotty, Bellaire, Tex., assignor to The Texas Company, New York, N. Y., a corporation of Delaware Application April 20, 1953, Serial No. 349,839

4 Claims. (Cl. 250—83.3)

This invention relates to a method for determining the nature and properties of formations traversed by a well bore hole, more particularly to a method for determining the porosity and permeability of gas formations. The principal object of the invention is the provision of a method of this type by means of which information as to the physical properties of subsurface gas formations can be obtained without any contamination of the bore hole formation by radioactivity and without the necessity of using complicated apparatus. Briefly the invention involves the making of neutron logs of the formations to be examined, some of these logs being made before and some during or after the saturation of the formation with a liquid.

During the past few years neutron logs of bore holes have been adopted by the oil industry as an additional means whereby information as to the nature of subsurface formations can be obtained, which information is not readily obtainable by other means. Neutron logs are generally of two types, i. e., the neutron-neutron or scattered neutron log, and the neutron-gamma ray or induced gamma ray log. In the former, a source of neutrons is passed through the bore hole so that neutrons will bombard the formation and a measurement is made in the vicinity of the source of the intensities of neutrons which are slowed down and scattered in the formations and returned to the bore hole. In the induced gamma ray log the source of neutrons is passed through the hole but the measurement is made of the intensity of the gamma rays which are induced or emitted from the atoms of the formations due to the neutron bombardment thereof. Since both of these logs can be used to determine the hydrogen content of subsurface formations they will be referred to hereinafter generally as "neutron" logs.

A method of determining quantitively the porosity of subsurface formations has been devised in which method the location of the shale formations is first determined by any suitable means such as by a natural gamma ray log of the hole. A neutron log is then made of the same hole and on the curve obtained thereby a base line is established, this base line coinciding with the intensity opposite the shale formations as indicated by the natural gamma ray log. This line serves as a base or reference line and by measuring deflections from this base line to predetermined points on the neutron curve opposite the non-shale formations, the porosities of the formations at these depths can be determined quantitively.

The method described is useful mainly in measuring the porosity of porous formations free of shale and containing only oil and water. Gas, even under pressure, contains less hydrogen per unit volume than either oil or water, and because of this fact and the variable amount of interstitial water present in the gas-containing formation the logs described in the copending application do not indicate porosity under these circumstances.

In accordance with the present invention, for determining the porosity and permeability of a gas-containing formation a hydrogen-containing liquid such as oil or water is injected into the porous zone or section containing gas and neutron logs are made both before and after this injection. A good indication of the porosity of the formation can then be obtained. With this procedure the formation will be saturated in the vicinity of the well bore with oil or water to within an irreducible gas saturation of five to ten percent of the pore space and the logs can then be interpreted as described above.

In addition to obtaining the porosity of the gas-containing formation a permeability profile of the formation can be obtained. Thus a quantitative permeability measurement can be made when the liquid is injected under constant pressure and several neutron logs run at spaced intervals of time. A plot of radioactivity versus time will permit the calculation of the permeability of the zone of a formation being studied.

For a better understanding of the invention reference may be had to the accompanying drawing in which the single figure is a vertical sectional elevation of a portion of a bore hole traversing a subsurface formation which contains both oil- and gas-bearing sections.

Referring to the drawing, the bore hole 10 is shown as traversing the formation 12 which contains the oil section 14 and the overlying gas section 16. The upper portion of the well is provided with a conventional casing 18 and a closed casing head 20. Passing downwardly through the bore hole is a string of tubing 22 and connected to the tubing is a pump 24 which is connected through the meter 26. This pump 24 serves to force a liquid such as drilling mud 28 downwardly through the tubing. Also connected to the casing head 20 is a pump 30 and meter 32. The pump 30 forces a hydrogen-containing liquid 34 such as oil or water downwardly through the annular space between the tubing 22 and the casing 18 or the walls of the bore hole. When both pumps are in operation a liquid interface 36 will exist between the liquids 28 and 34 and by varying the rates of pumping or injection this interface can be made to move upwardly or downwardly in the bore hole. The rates of injection are preferably such that the interface 36 will be substantialy opposite the fluid interface 38 existing in the formation 12 between the oil section 14 and the gas section 16. The oil or water 34 will then be forced into the gas formation 16 as indicated by the arrows.

Shown as suspended within the tubing 22 on a conductor cable 40 is a neutron well logging instrument 42, this instrument comprising a sealed housing in the lower portion of which is disposed a source of neutrons 44 which may comprise a mixture of radium and beryllium. Above the source 44 is a detector 46. In the case of a scattered neutron log the detector 46 will be a device responsive to scattered or slow neutrons and in the case of an induced gamma ray log the detector 46 will be a device responsive to the gamma rays induced in the formation by neutron bombardment. As stated hereinbefore, in the present invention it does not matter whether a scattered neutron log or an induced gamma ray log is made of the hole, and for this reason the device 46 will be referred to merely as the detector. A neutron 48 is shown by the dotted line as passing from the source 44 into the formation 16 and the dotted line 50 indicates here a scattered neutron or an induced gamma ray passing back to strike the detector 46. Between the source 44 and the lower end of the detector 46 is a suitable shield 52 of a material which will absorb direct radiation from the source 44 which would otherwise pass upwardly to strike the detector 46 and cause spurious indications. The output of the detector 46 passes to a suitable preamplifier 54 and upwardly through the cable 40 to a suitable recording device 56. The cable 40 passes over a cable measuring device 58 which indicates continuously the position or depth of the instrument 42 in the bore hole. The instrument 42 which has been described is a more or less conventional neutron lagging instrument.

In order to measure the porosity of the gas section 16, a neutron log is first made of that portion of the bore hole containing the formation 12 by passing the instrument 42 through the hole and recording the response of the detector 46 in correlation to the depth of the instrument in the hole. While making this log, the interface should be above the section 16. The pumping rates of the liquids 28 and 34 are then adjusted so that the interface 36 will be positioned and remain substantially opposite the water-gas contact 38 and the oil or water 34 will be injected into the gas section 16 as indicated by the arrows. After this injection has gone on for a sufficient time to saturate that portion of the section 16 in the vicinity of the bore hole, the ratio of pumping the two liquids is changed so as to move the interface 36 upwardly past the upper boundary of the formation 12 and a second neutron log is then made by means of the instrument 42 and the two logs are compared. If the second neutron log shows a change over the first log for that portion representing the gas section 16, it indicates that the section 16 is porous. If a sufficient quantity of the oil or gas has been injected into the formation, the porosity can be determined quantitatively as has been described hereinabove. If the formation 12 contains an oil layer or section 14 as well as the gas section 16, the first neutron log which is run will show clearly the location of the oil-gas contact 38 since oil has a much greater hydrogen content than gas. If the second neutron log shows no change over the first log, it will indicate that the section 16 is impermeable and, therefore, not important. This may also indicate that the zone appearing to have gas actually did not contain gas originally and has a very low porosity. With the method described a quantitative permeability determination can be obtained if the oil or water 34 is injected into the formation under constant pressure and several logs run at spaced intervals of time. The changes in radioactivity as shown in the consecutive logs, plotted against time, will permit the calculation of permeability.

Obviously many other modifications and variations of the invention, as hereinbefore set forth, may be made without departing from the spirit and scope thereof, but only such limitations should be imposed as are indicated in the appended claims.

I claim:

1. The method of determining the porosity of a gas-containing section of a subsurface formation traversed by a well bore hole containing a string of tubing extending down to a point below said formation, comprising making a neutron log of that portion of the bore hole traversing said formation, simultaneously pumping a hydrogen-containing fluid down through the annulus around said tubing and a nonhydrogenous fluid down through said tubing, adjusting the pumping rates of said fluids so as to position the fluid interface in said annulus at about the lower boundary of said gas-containing formation, increasing the pumping rate of said hydrogen-containing fluid while maintaining said interface at said position so that the hydrogen-containing fluid will pass into said gas-containing section, subsequently making another neutron log of said formation and comparing the two logs to determine the hydrogen content of said section after its saturation.

2. The method described in claim 1 in which said interface is raised and maintained at a new position above said gas-containing formation while said second neutron log is being made.

3. The method described in claim 1 in which the position of said interface is determined by passing a source of neutrons through the bore hole, measuring in the vicinity of said source secondary radiation from the fluids in the bore hole caused by bombardment of said fluids by said neutrons, a sudden change in the intensity of said secondary radiation indicating that the source is passing said interface, and noting the depth of said source in the bore hole.

4. The method described in claim 1 but in which the permeability of the gas-containing section is determined, the hydrogen-containing fluid being injected into said section at a constant rate and a plurality of neutron logs being made at spaced time intervals during said injection, said logs then being compared to determine the increase with time in the hydrogen content of said section, said increase being a measure of the permeability of said section.

References Cited in the file of this patent
UNITED STATES PATENTS

| | | |
|---|---|---|
| 2,352,993 | Albertson | July 4, 1944 |
| 2,443,680 | Herzog | June 22, 1948 |